United States Patent [19]

Prindle

[11] Patent Number: 4,928,893
[45] Date of Patent: May 29, 1990

[54] FOOD PROCESSOR
[75] Inventor: William A. Prindle, Santa Barbara, Calif.
[73] Assignee: Robinson Knife Manufacturing Co., Inc., Springville, N.Y.
[21] Appl. No.: 335,224
[22] Filed: Apr. 10, 1989
[51] Int. Cl.$^5$ ............................................. A47J 43/06
[52] U.S. Cl. ...................................... 241/95; 241/100; 241/273.2; 241/285 A
[58] Field of Search .................. 241/95, 285 R, 285 B, 241/100, 273.1, 273.2, 273.3, 273.4, 101.1, 168, 169.1, 285 A; 83/856, 857, 858

[56] References Cited
U.S. PATENT DOCUMENTS

| | | |
|---|---|---|
| 555,834 | 3/1896 | Taylor . |
| 1,160,043 | 11/1915 | Clark . |
| 2,505,114 | 4/1950 | Hayman et al. ..................... 146/180 |
| 2,615,486 | 10/1952 | Marcus ................................ 146/180 |
| 2,714,908 | 8/1955 | Carmack ............................. 146/171 |
| 2,720,234 | 10/1955 | Fett ..................................... 146/180 |
| 3,858,815 | 1/1975 | Black .................................. 241/168 |
| 4,055,308 | 10/1977 | Ackeret .............................. 241/100 |
| 4,212,431 | 7/1980 | Doyel .................................. 241/100 |
| 4,247,054 | 1/1981 | Schulein et al. .................... 241/95 |
| 4,546,928 | 10/1985 | Suzuki ................................. 241/95 |

FOREIGN PATENT DOCUMENTS 27111 of 1898 United Kingdom .................. 241/95

OTHER PUBLICATIONS

"Multigrater" Advertising Material (2 sheets); data unknown.

Primary Examiner—Joseph M. Gorski
Attorney, Agent, or Firm—Bean, Kauffman & Spencer

[57] ABSTRACT

A food processor includes a hollow shredder member having food cutting elements, an open mouth container removably insertable within the shredder member for collecting food processed by the cutting elements and a hollow handle member for guiding food into engagement with the cutting elements. The shredder and handle members are releasably rotatably connected for purposes of placing the food cutting elements one at a time in an operative food cutting position relative to the handle member. The processor has a stored configuration wherein the container is placed within the confines of the shredder member and the latter is placed within the confines of the handle member.

8 Claims, 2 Drawing Sheets

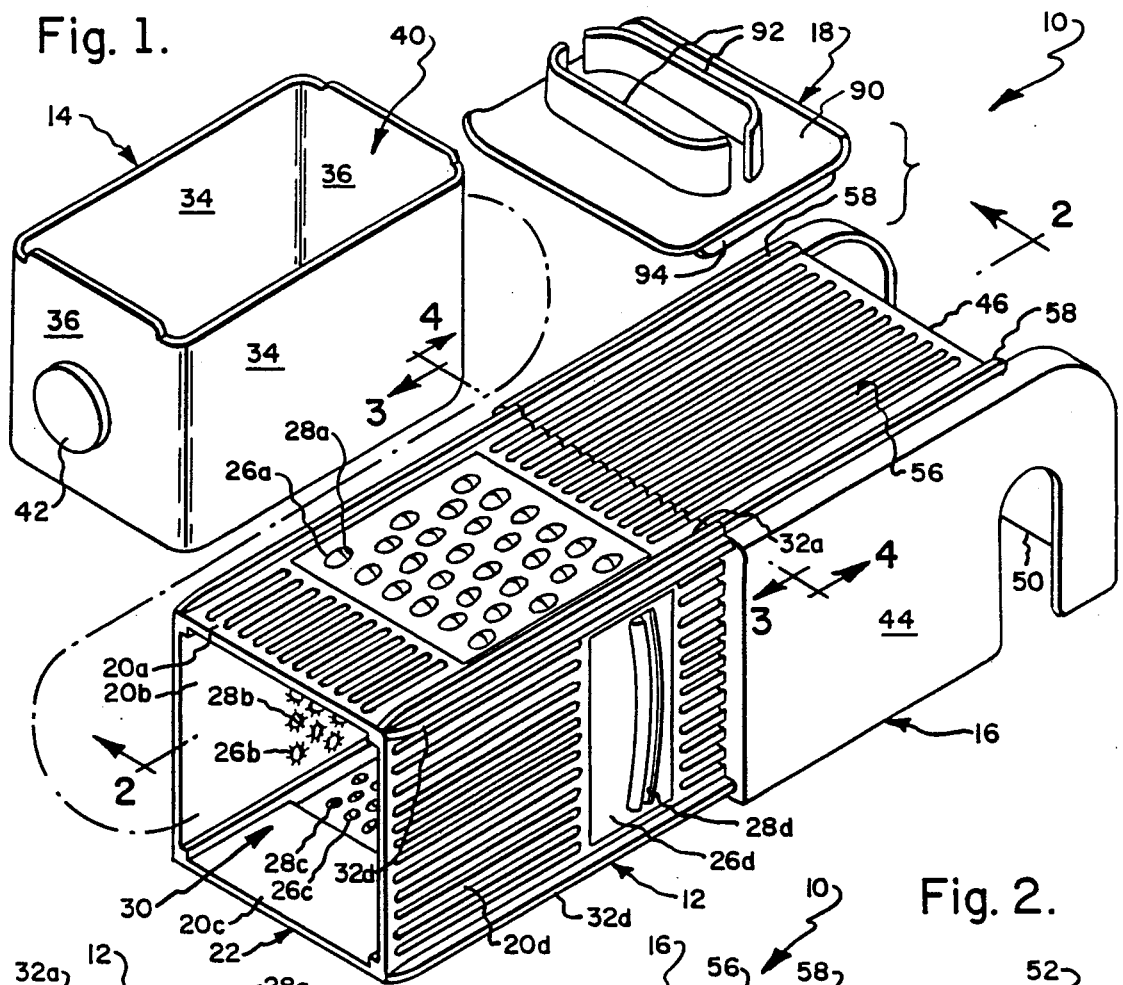
Fig. 1.
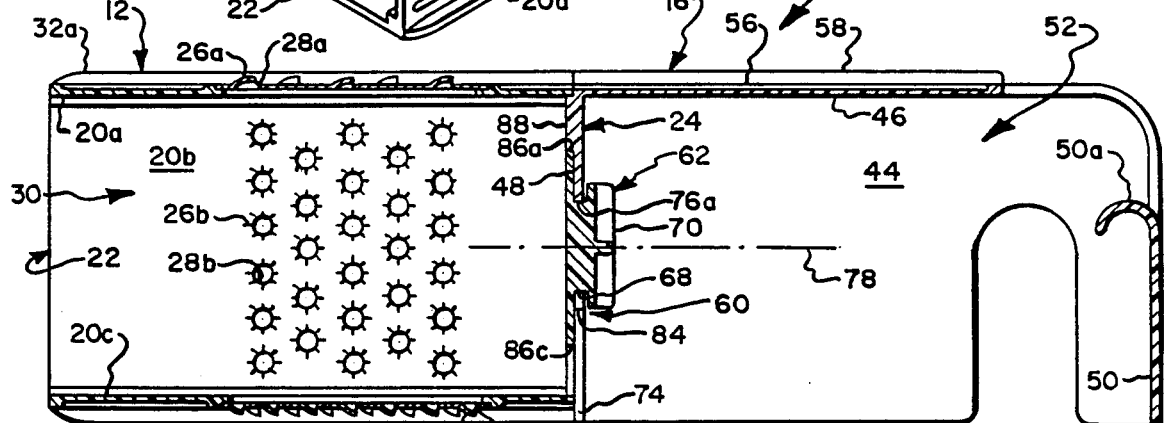
Fig. 2.
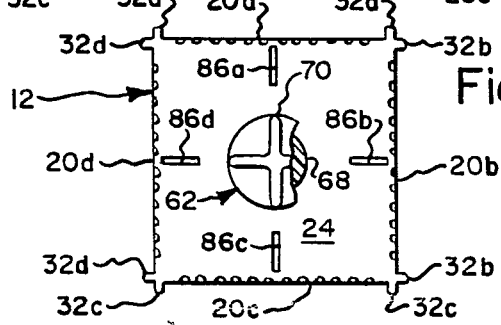
Fig. 3.
Fig. 4.

FOOD PROCESSOR

BACKGROUND OF THE INVENTION

The present invention relates to food processors suitable for use in grating, slicing and cutting diverse foods, e.g. vegetables, fruits, etc., into thin strips or fine filaments.

More particularly, the invention is directed towards improvements in food processors of the general type disclosed for example in U.S. Pat. Nos. 4,055,308 and 4,546,928, wherein a shredder member carrying a plurality of diverse food cutting elements is supported for rotation relative to a member providing a guide surface for food to be processed, such that the cutting elements may be selectively placed one at a time in an operative position relative to such guide surface.

SUMMARY OF THE INVENTION

The present invention is directed to a food processor having a plurality of diverse food cutting elements selectively, removably positioned one at a time in an operative position for food cutting purposes, characterized in that the components defining the food processor may be disassembled after use and stored in a compact storage configuration.

More particularly, the food processor of the present invention includes a hollow shredder member mounting a plurality of diverse cutting elements, an open mouth container for collecting food processed by the cutting elements, a hollow handle member defining a food guide surface and a food pusher plate. The shredder member and handle member are removably connected to permit selective placement of the food cutting elements one at a time in end-to-end alignment with the food guide surface and to alternatively, releasably retain the food processor in a compact storage configuration characterized in that the pusher plate is housed within the container, which is in turn housed within the shredder member, which is in turn housed within the handle member.

BRIEF DESCRIPTION OF THE DRAWINGS

The nature and mode of operation of the present invention will now be more fully described in the following detailed description taken with the accompanying drawings wherein:

FIG. 1 is a partially exploded, perspective view of a food processor of the present invention;

FIG. 2 is a sectional view taken generally along the line 2—2 in FIG. 1;

FIG. 3 is a view taken generally along the line 3—3 in FIG. 1;

FIG. 4 is a view taken generally along the line 4—4 in FIG. 1;

DETAILED DESCRIPTION

Figure 5:
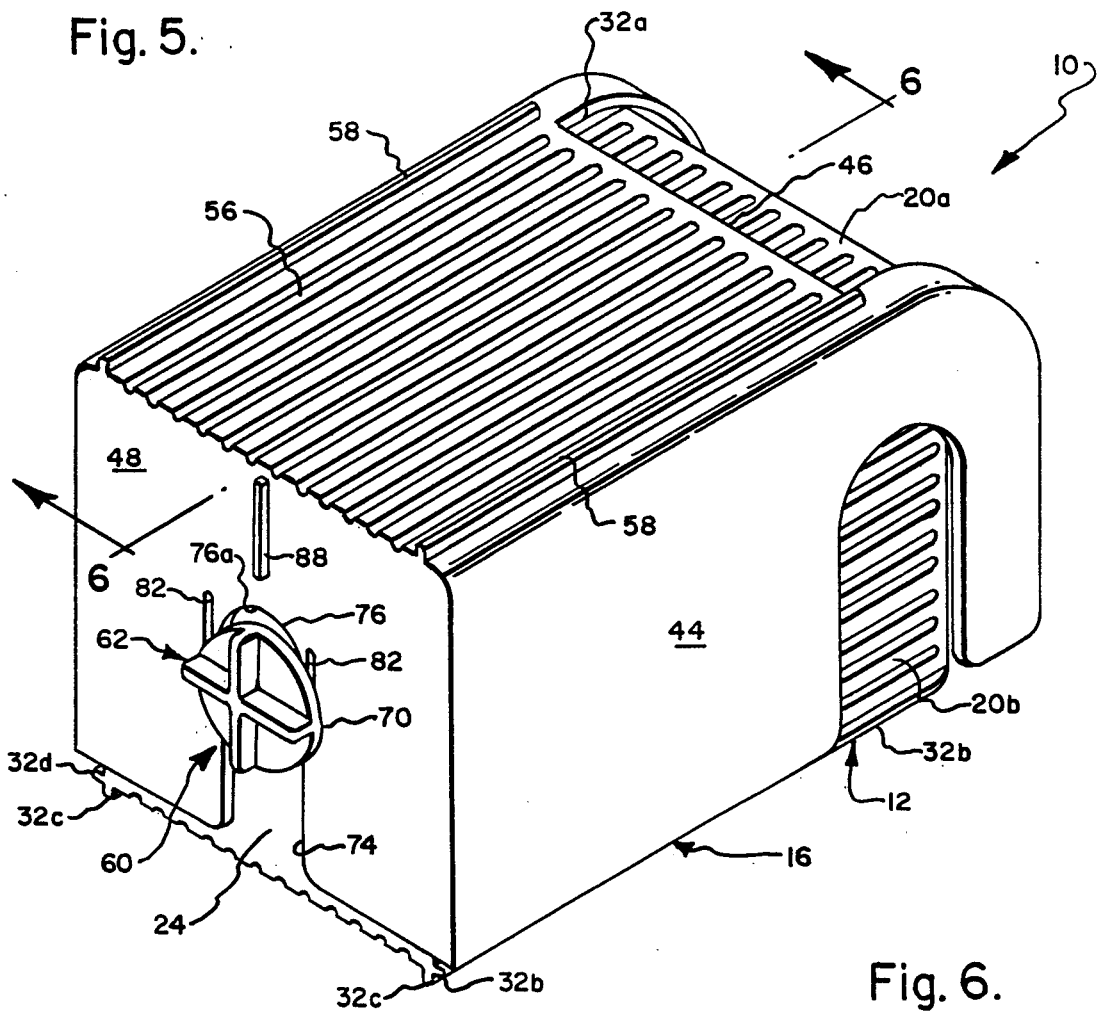
FIG. 5 is a perspective view of the food processor in stored condition.

A food processor formed in accordance with the present invention is generally designated as 10 and shown in FIG. 1 as including a food shredder member 12, a processed food receiving container 14; a handle member 16 and a manually operated food pusher plate 18. Pusher plate 18 is preferably included as an element of food processor 10 for reasons of convenience and safety, but is not necessary to the practice of the present invention.

Shredder member 12 is shown in FIGS. 1-3 as being of a hollow, elongated and generally square cross-sectional construction, and as having sides 20a-20d extending between an open end 22 and a mounting end 24. Sides 20a-20d carry diverse food cutting or grating elements 26a-26d of conventional construction having apertures 28a-28d opening through the sides into the hollow interior 30 of shredder member 12. Each of sides 20a-20d is also provided with a pair of outwardly projecting, parallel guide rails 32a-32d for the reason to be described. Preferably, the whole of shredder member 12 is of construction, except for cutting elements 26a-26d, which would typically be formed of a suitable rust resistant metal.

Figure 6:
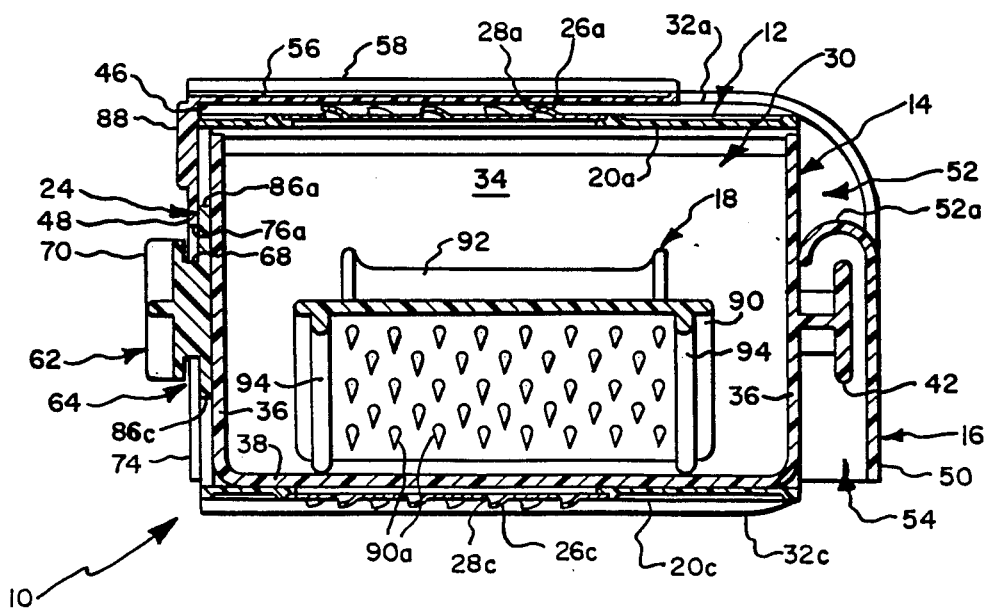
FIG. 6 is a sectional view taken generally along the line 6—6 in FIG. 5.

Container 14 is defined by joined opposite side, opposite end and bottom walls 34, 36 and 38, respectively, which are arranged to provide an open top or mouth 40. Container 14 is preferably provided with a pull handle 42 projecting from one of opposite end walls 36 for use in removably inserting the container within interior 30 of shredder member 12 through open end 22 to position open top 40 in alignment with a selected one of food cutting elements 26a-26d for receiving processed food passing inwardly of the shredder member through apertures 28a-28d. Preferably, container 14 is sized to be slidably received within interior 30, such that when the container is fully inserted, pull handle 42 projects outwardly through open end 22, as shown in FIG. 6. Container 14 is preferably integrally mold formed of a suitable transparent plastic material.

Handle member 16 is defined by joined side walls, an upper wall, a mounting end and a handle end 44, 46, 48 and 50, respectively, which cooperate to define a hollow interior 52 accessible through a downwardly facing or bottom opening 54. Upper wall 46 defines a food guide surface 56 bounded by a pair of parallel guide rails 58 and 58, and handle end 50 is shaped to define a smoothly curved handle 50a to be gripped by a user when processor 10 is to be placed in use. Handle member 16 is preferably integrally mold formed of a suitable plastic material. The length of shredder member 12, as measured lengthwise of sides 20a-20d, and the width of shredder member 12, as measured transversely of each of such sides between edges defined by the junctures of such sides with their adjacent sides, are shown in FIGS. 5 and 6 as being less than the length of hollow interior 52, as measured between inner surfaces of mounting end 48 and handle end 50, and the width of the hollow interior, as measured between inner surfaces of side walls 44 and 44. Thus, as will be described, shredder member 12 is adapted to be removably placed within hollow interior 52 for storage purposes.

Mounting ends 24 and 48 cooperate to define mounting means 60 for removably joining shredder member 12 to handle member 16 for rotation in order to selectively position sides 20a-20d and thus cutting elements 26a-26d successively in end-to-end alignment with guide surface 56, incidental to which guide rails 32a-32d are positioned in end-to-end alignment with guide rails 58; and when desired for removably retaining the shredder member in a stored condition within interior 52 of the handle member in the manner shown in FIGS. 5 and 6.

In the presently preferred construction, mounting means 60 includes a rotor member 62, which is fixed to mounting end 24; and bearing means 64 and retaining means 66, which are carried by or defined by mounting end 48, as best shown in FIGS. 3 and 4. Rotor member 62 is shown in FIGS. 2 and 3 as having a generally mushroom-shaped configuration defined by a cylindrical portion 68 and an enlarged end or head portion 70. Bearing means 64 is shown in FIGS. 2 and 4 as including a mounting opening or slot 72, which lies within a plane disposed normal to food guide surface 56 and has an insertion end 74 and a bearing end 76 defining a bearing surface 76a for removably journalling cylindrical portion 68 for rotation about an axis 78 extending lengthwise of shredder member 24 and handle member 16 when joined as shown in FIGS. 1 and 2, and resiliently deformable detents 80 and 80 shown in FIG. 4 as projecting into the mounting opening for purposes of releasably retaining the cylindrical portion in bearing engagement with the bearing surface. Engagement of head portion 70 with the inner surface of mounting end 48 prevents separating movements of shredder member 12 and handle member 16 in a direction aligned with axis 78, when cylindrical portion 68 is engaged with bearing surface 76a. Preferably, mounting opening 72 is vertically disposed and insertion end 74 simply comprises a downwardly facing open end of the mounting opening, as best shown in FIG. 4. Detents 80 and 80 may be rendered resiliently deformable, as by providing mounting end 48 with a pair of relief slots 82 and 82, which bound mounting opening 72 and extend intermediate insertion and bearing ends 74 and 76, to facilitate flexure of the plastic material of which mounting end 48 is formed. Retaining means 66 is best shown in FIG. 4 as including a second pair of resiliently deformable detents 84 and 84, which project into mounting opening 72 intermediate insertion end 74 and detents 80 and 80, and as in the case of the latter detents are rendered resiliently deformable principally by means of relief slots 82 and 82.

By now referring to FIGS. 2, 3 and 4, it will be understood that latch means, which is defined for example by four uniformly spaced slot recesses 86a–86d formed in the outer surface of mounting end 24 and a single rib 88 projecting from the outer surface of mounting end 48, is employed to releasably latch cutting elements 26a–26d successively in end-to-end alignment with food guide surfaces 56, as shredder member 12 is rotated relative to handle member 16 about axis 78. Resilient deformation or flexures of the plastic material forming mounting ends 24 and 28 allows rib 88 to snap into and out of slot recesses 86a–86d as an incident to relative rotation of the shredder and handle members.

Pusher plate 18 may be of any desired construction, but for purposes of reference it is considered as including a pressure/pusher plate 90 having downwardly projecting food engaging elements 90a shown only in FIG. 6, an upstanding handle portion 92 and a pair of depending guide ribs 94 and 94, which are spaced apart as required to slidably engage with guide rails 58 and 58 of handle member 16 and guide rails 32a–32d of shredder member 12.

Operation of processor 10 will now be described by assuming that shredder member 12 and handle member 16 have been first assembled as shown in FIGS. 1 and 2 by manually moving these members transversely of one another as required to seat cylindrical portion 68 in engagement with bearing surface 76a. Thereafter, shredder member 12 and handle member 16 are manually rotated or adjusted relative to one another until a selected one of cutting elements 26a–26d, such as for example cutting element 26a as shown in FIG. 1, is aligned with food guide surface 56; rib 88 being automatically inserted within slot recess 86a associated with selected cutting element 26a to releasably latch the shredder and handle members against rotation, during a subsequent food processing operation.

The thus adjusted shredder and handle members would then normally be laid on a flat surface, such as a table or kitchen counter, with the lower edges of handle member side walls 44 and mounting end 48, and with the guide rails of that one of the shredder member sides disposed opposite to the side of the selected cutting element, such as for example guide rails 32c as shown in FIG. 2, disposed in engagement with the flat surface. Thereafter, in succession, container 14 is inserted into shredding member 12 to position its mouth 20 in alignment with the selected cutting element; food to be processed is placed on guide surface 56, handle 50a is gripped by one hand of the user and pusher plate 18 is manipulated by the other hand of the user for purposes of forcing the food to slide lengthwise of the guide surface and into engagement with the selected cutting element, which serves in turn to cut one or more portions from the food and direct same inwardly of the shredder member for collection within container 14. When a desired amount of processed food has been collected in container 14, the container is withdrawn from shredding member 12, food removed therefrom and the elements of processor 10 cleaned, as required, in preparation for the next processing operation.

After completion of a food processing operation, processor 10 may be stored in a compact form by a sequence of steps including placing pusher plate within container 14, placing the container with shredding member 12, such that essentially only pull handle 42 projects therefrom, and finally placing the shredder member within handle member 16, as depicted in FIGS. 5 and 6, whereafter detents 84 and 84 serve to retain the shredder and handle members in their illustrated stored condition.

What is claimed is:

1. A food processor comprising in combination:

a hollow food shredder member having an open end, a mounting end and plural sides extending between said open end and said mounting end, said sides being provided with a food cutting element each formed with at least one aperture opening through said sides into the interior of said shredder member;

an open mouth processed food receiving container removably insertable within said shredder member through said open end for selectively positioning said open mouth thereof in alignment with a selected one of said sides to receive food processed by said cutting element thereof;

a handle member having a hollow interior and including an upper wall defining a food guide surface, opposite ends and a pair of a side walls depending from said upper wall intermediate said opposite ends and cooperating with said opposite ends to define an opening communicating with said hollow interior, said opening and said hollow interior being sized to permit said shredder member to be removably inserted into said hollow interior between said side walls with said open end and mounting end of said shredder member disposed adjacent said opposite ends;

mounting means for removably joining said mounting end of said shredder member for rotation relative to one of said opposite ends of said handle member to selectively, removably position said selected ones of said sides in end-to-end alignment with said guide surface and alternatively for removably retaining said shredder member within said hollow interior of said handle member.

2. A food processor according to claim 1, wherein said mounting means includes a rotor member carried by one of said mounting end and said one of said opposite ends, bearing means and retainer means carried by the other of said mounting end and said one of said opposite ends, said bearing means defining a bearing surface for removably, rotatably supporting said rotor member thereby to join said shredder member for rotation relative to said handle member, and said retainer means releasably retains said shredder within said handle member.

3. A food processor according to claim 2, wherein said shredder member and said handle member define latch means for releasably retaining said sides one at a time in end-to-end alignment with said guide surface when said rotor member is rotatably supported by said bearing surface.

4. A food processor according to claim 3, wherein said container is provided with a pull handle, said interior of said shredder member is sized to receive said container while allowing said pull handle to project outwardly through said open end thereof, and said hollow interior of said handle member is sized to receive both said shredder member and said pull handle when said container is disposed within said interior of said shredder member.

5. A food processor comprising in combination:
a hollow food shredder member having an open end, a mounting end and plural sides extending between said ends, at least certain of said sides having food cutting elements formed with apertures opening through said sides into the interior of said shredder member;

an open mouth processed food receiving container having a pull handle, said container being sized to be wholly slide-fit received within the interior of said shredder member through said open end except for said pull handle for selectively, removably positioning said open mouth in alignment with a selected one of said certain sides to receive food processed by said cutting elements passing through said apertures; and a handle member having a mounting end and a food guide surface extending from adjacent said mounting end, said mounting end of one of said shredder member and said handle member having a rotor member and said mounting end of the other of said shredder member and said handle member defining a mounting slot extending within a plane disposed normal to said food guide surface, said slot having an insertion end for removably receiving said rotor member, a bearing end for journalling said rotor member for selectively, removably positioning said cutting elements in alignment with said guide surface, and resiliently deformable detent means arranged between said insertion and bearing ends for releasably retaining said rotor member in journalled engagement with said bearing end.

6. A food processor according to claim 5, wherein said detent means is rendered resiliently deformable by slot means arranged adjacent said mounting slot to extend intermediate said insertion and bearing ends.

7. A food processor according to claim 5, wherein said handle member is hollow and internally sized to receive said shredder member and said pull handle when said container is received within said shredder member, said mounting slot is provided with second resiliently deformable detent means arranged intermediate said insertion end and said detent means, and said second detent means releasably retains said shredder member within said handle member.

8. A food processor according to claim 7, wherein said food processor further includes a pusher plate for pushing food along said food guide surface into engagement with that one of said cutting elements aligned therewith, and said pusher plate is sized to be wholly received within said container.

* * * * *

UNITED STATES PATENT AND TRADEMARK OFFICE
CERTIFICATE OF CORRECTION

PATENT NO. : 4,928,893
DATED : May 29, 1990
INVENTOR(S) : William A. Prindle

It is certified that error appears in the above-identified patent and that said Letters Patent is hereby corrected as shown below:

Col. 2, line 14 - after "of", insert ---molded plastic---.

Col. 4, line 61 - after "of", delete ---a---.

Signed and Sealed this

Fourteenth Day of January, 1992

Attest:

HARRY F. MANBECK, JR.

*Attesting Officer*    *Commissioner of Patents and Trademarks*